US010414630B2

(12) United States Patent
Geroso et al.

(10) Patent No.: US 10,414,630 B2
(45) Date of Patent: Sep. 17, 2019

(54) UNIVERSAL ADAPTER ASSEMBLY FOR CONNECTING A ROLLER GUIDE TO A FRAME OF AN ELEVATOR CAR

(71) Applicant: ELEVATOR SAFETY COMPANY, Owings Mills, MD (US)

(72) Inventors: Jeffery Geroso, Baltimore, MD (US); Andrew James Laughton, Ellicott City, MD (US)

(73) Assignee: ELEVATOR SAFETY COMPANY, Owings Mills, MD (US)

( * ) Notice: Subject to any disclaimer, the term of this patent is extended or adjusted under 35 U.S.C. 154(b) by 307 days.

(21) Appl. No.: 15/624,940

(22) Filed: Jun. 16, 2017

(65) Prior Publication Data
US 2017/0283218 A1 Oct. 5, 2017

Related U.S. Application Data

(63) Continuation of application No. 14/841,568, filed on Aug. 31, 2015, now Pat. No. 9,708,161.

(51) Int. Cl.
*B66B 7/04* (2006.01)
*F16M 13/02* (2006.01)

(52) U.S. Cl.
CPC ............. *B66B 7/046* (2013.01); *F16M 13/02* (2013.01)

(58) Field of Classification Search
CPC ................................ B66B 7/046; F16M 13/02
See application file for complete search history.

(56) References Cited

U.S. PATENT DOCUMENTS

| 1,066,236 | A | * | 7/1913 | Wells | .................. E05D 15/0634 16/105 |
| 3,329,240 | A | * | 7/1967 | Harwood | ................ B66B 7/046 187/410 |
| 5,279,393 | A | * | 1/1994 | Lloyd | ....................... B66F 9/07 187/410 |
| 6,698,138 | B1 | * | 3/2004 | Lin | ..................... E05D 15/0639 16/105 |
| 7,562,749 | B2 | * | 7/2009 | Race, Sr. | ................ B66B 7/042 187/409 |
| 8,251,186 | B2 | * | 8/2012 | Webster | .................... B66B 7/04 187/401 |

(Continued)

FOREIGN PATENT DOCUMENTS

JP 3-177287 8/1991

*Primary Examiner* — Michael A Riegelman
(74) *Attorney, Agent, or Firm* — Merek, Blackmon & Voorhees, LLC

(57) ABSTRACT

A universal adapter assembly for connecting a roller guide to a frame of an elevator car where an existing hole pattern in the frame of the elevator car is different from an existing hole pattern of the roller guide. The assembly includes an upper member having a hole pattern complementary to the hole pattern of the roller guide permitting the roller guide to be readily connected to the upper member. The assembly includes at least one low member connected to and disposed below the upper member. The upper and lower members each include at least one enlarged opening to permit relative adjustment of the members to compensate for the differing hole patterns of the roller guide and the frame of the elevator car. Preferably, the assembly is configured to be light weight, easy to install and capable of providing additional vibration damping.

20 Claims, 5 Drawing Sheets

(56) References Cited

U.S. PATENT DOCUMENTS

| | | | | |
|---|---|---|---|---|
| 8,950,041 | B2* | 2/2015 | Palsson | E05D 15/0634 16/102 |
| 9,038,316 | B2* | 5/2015 | Von Gerichten | E05D 15/063 49/360 |
| 9,163,445 | B2* | 10/2015 | Andren | E05D 15/0634 |
| 10,145,166 | B2* | 12/2018 | Berger | E06B 3/4663 |
| 2015/0198871 | A1* | 7/2015 | Piraino | F16M 13/02 248/309.1 |
| 2015/0321885 | A1* | 11/2015 | Laughton | B66B 7/048 187/410 |
| 2017/0057785 | A1* | 3/2017 | Geroso | F16M 13/02 |

* cited by examiner

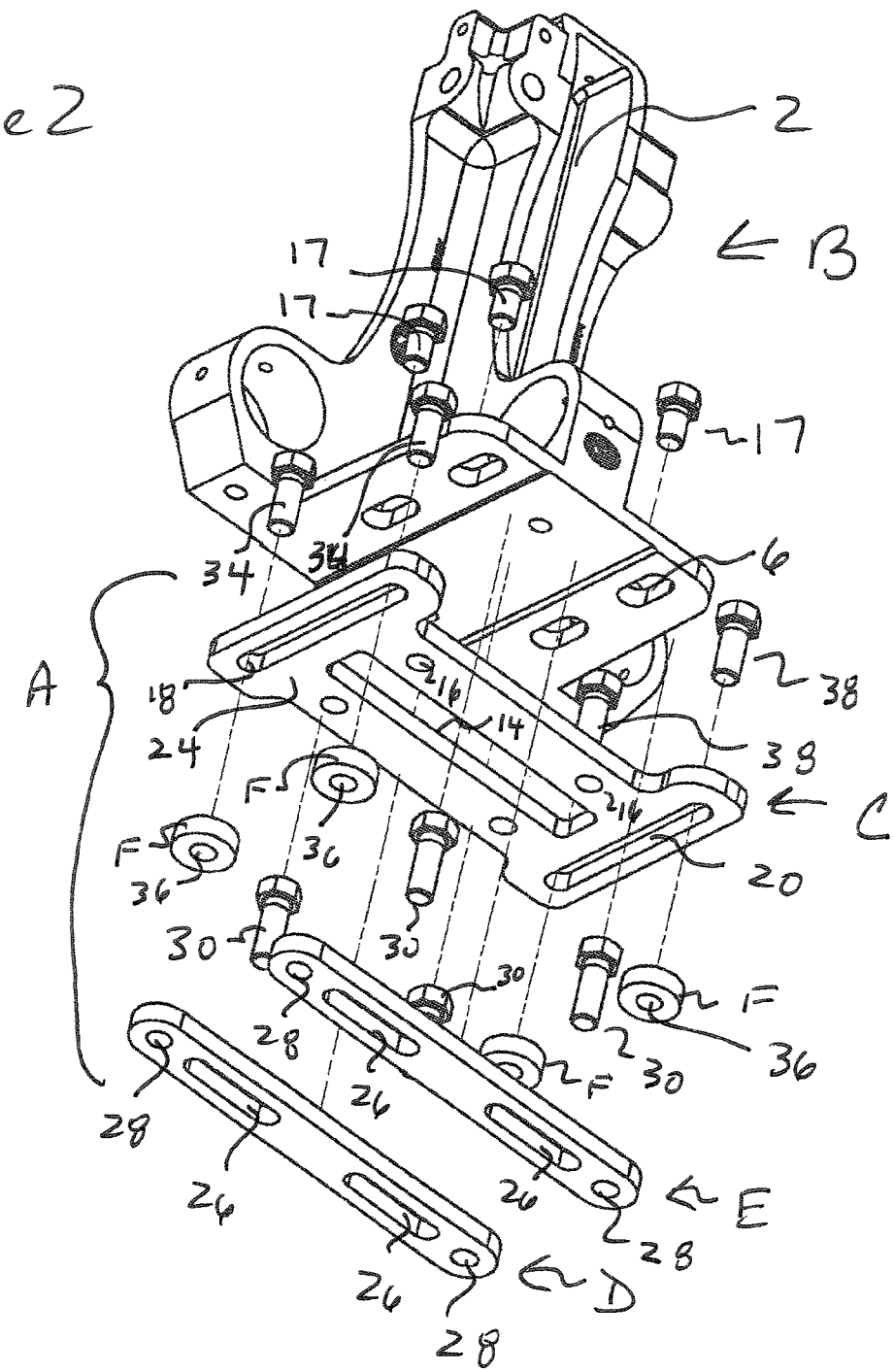

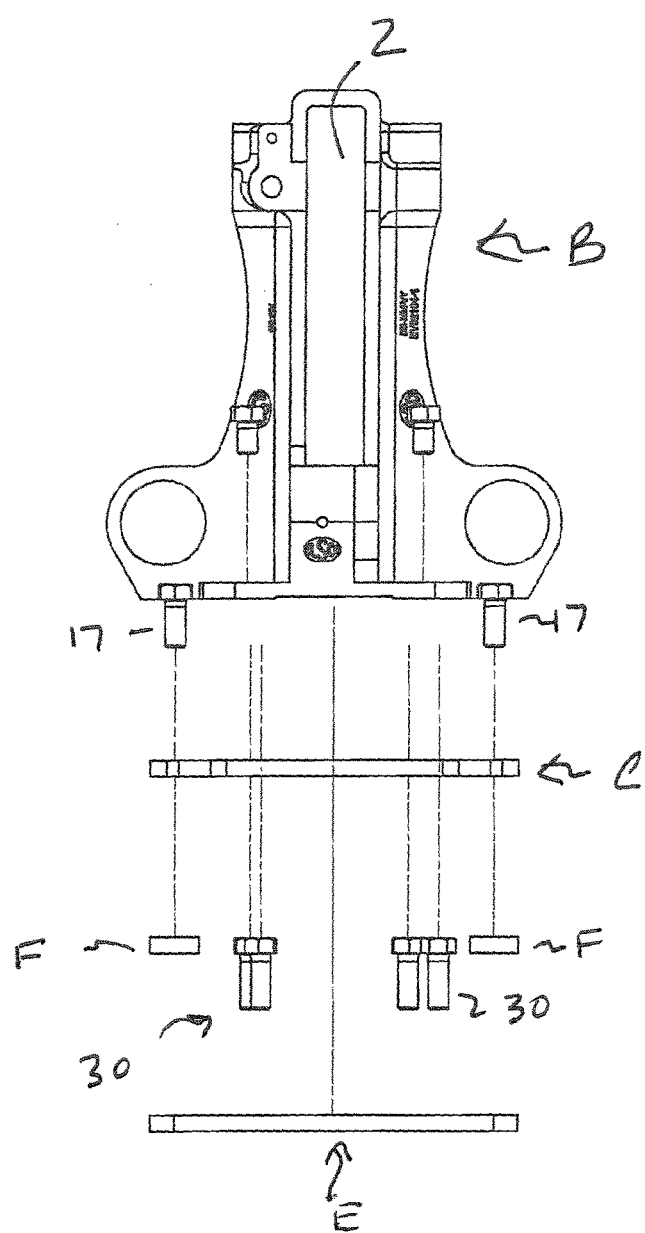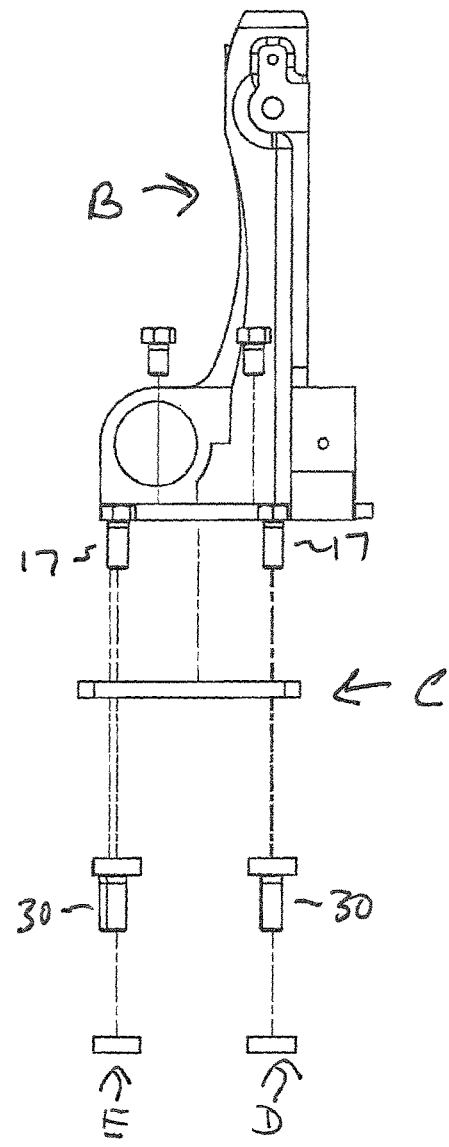

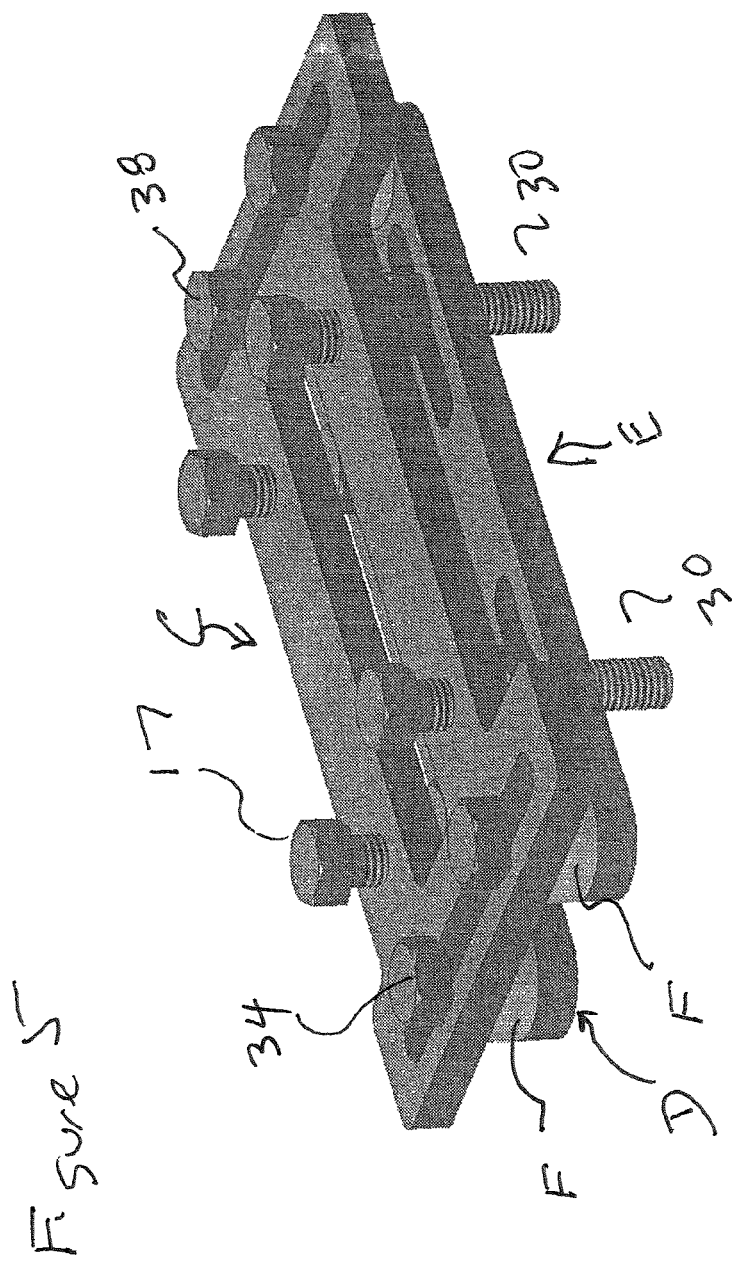

UNIVERSAL ADAPTER ASSEMBLY FOR CONNECTING A ROLLER GUIDE TO A FRAME OF AN ELEVATOR CAR

RELATED PATENT APPLICATION

The subject patent application is a continuation of U.S. patent application Ser. No. 14/841,568 filed on Aug. 31, 2015 from which priority is claimed under 35 USC § 120. The entire contents of U.S. patent application Ser. No. 14/841,568 are incorporated herein by reference.

FIELD OF THE INVENTION

The present invention is directed to a universal adapter assembly for connecting a roller guide to a frame of an elevator car where a hole pattern in the frame of the elevator car is different from an existing hole pattern of the roller guide.

BACKGROUND OF THE INVENTION

Typically, an elevator car travels along a pair of opposing guide rails located in a shaft or hoistway of a building structure. It is customary to employ four roller guides per elevator car to guide the elevator car along the guide rails as the car is moved in a shaft or hoist way. Two of the rollers guides are secured to the upper portion of the elevator car in such a manner as to engage the corresponding guide rails. The remaining two roller guides are secured to the lower portion of the elevator car in a similar manner to engage the corresponding guide rails. Typically, roller guides have a plurality of rollers that engage and travel along the corresponding guide rail. Typically, each roller guide includes three or six rollers. The present invention is not limited to elevator roller guides having a particular number of rollers. Rather, the present invention can be used with elevator roller guides having differing numbers of rollers. Roller guides typically include a base having a fixed pattern of openings through which bolts extend to mount or connect the roller guides to the frame of an elevator car. The pattern of openings in the base of different roller guides typically differ, i.e., no standard exists for the pattern of openings in the base of the differing types of roller guides.

Over time or with advancement in roller guides it becomes necessary to replace the existing roller guides mounted or connected to an elevator car. This replacement process typically requires a roller guide installer to measure the existing hole pattern of the frame of the elevator car whose roller guides are to be replaced. If it is determined that the existing hole pattern of the frame of the elevator car whose roller guides are to be replaced differs from the hole pattern of the replacement roller guides, then the installer must fabricate an adaptor plate that will compensate for the two differing hole patterns. The above process of measuring and comparing the existing hole pattern of the frame of the elevator car to the hole pattern of the replacement roller guide and then fabricating an adaptor plate specific to the replacement roller guide is extremely time consuming.

In an effort to overcome the aforementioned time consuming process, U.S. Pat. No. 8,251,186 discloses an adapter kit for mounting roller guides to the frame of an elevator car. However, this adapter kit has significant drawbacks including but not limited to the following: (i) the fixed orientation between the u-shaped lower bracket and the n-shaped upper bracket caused at least in part by abutment of the mating lips or flanges of the u-shaped lower brackets and the n-shaped upper bracket; (ii) the fixed parallel orientation of the two u-shaped lower brackets again caused at least in part by abutment of the mating lips or flanges of the u-shaped lower support and the n-shaped upper support; (iii) the differing orientation of the bolts used to connect the roller guide and adaptor kit to the frame of an elevator car (i.e., bolts used to connect the roller guide to the n-shaped bracket and the bolts used to connect the u-shaped brackets to frame of elevator car are oriented vertically while the bolts used to connect the u-shaped brackets to the n-shaped bracket are oriented horizontally); (iv) the time consuming process of mounting the adapter kit and corresponding roller guide to an elevator car frame which includes at least the following steps: (a) loosely securing the u-shaped brackets to the frame of the elevator car; (b) temporarily mounting the n-shaped bracket and the roller guide on the loosely secured u-shaped brackets for alignment purposes; (c) removing the n-shaped bracket and roller guide from the loosely secured u-shaped brackets; (d) tightening the u-shaped brackets to the frame of the elevator car; (e) remounting the n-shaped bracket and the roller guide on the u-shaped brackets; and (f) connecting the n-shaped bracket to the u-shaped brackets; and, (v) the inability of the adapter kit to dampen vibrations transmitted to the elevator car.

OBJECTS AND SUMMARY OF THE INVENTION

An object of the present invention is to provide a novel and unobvious mounting assembly for mounting an elevator roller guide to the frame of an elevator car.

Another object of a preferred embodiment of the present invention is to provide a universal adaptor for mounting an elevator roller guide to the frame of an elevator car where the hole pattern of the frame of the elevator car differs from the hole pattern in the base of an elevator roller guide without the need for an installer to fabricate an adaptor plate after determining that the existing hole pattern in a frame of an elevator car differs from the existing hole pattern in a roller guide.

A further object of a preferred embodiment of the present invention is to provide a universal adaptor for mounting an elevator roller guide to the frame of an elevator car that is relatively lightweight.

Yet another object of a preferred embodiment of the present invention is to provide a universal adaptor for mounting an elevator roller guide to the frame of an elevator car that significantly simplify the installation process and reduces installation time.

Still another object of a preferred embodiment of the present invention is to provide a universal adaptor for mounting an elevator roller guide to the frame of an elevator car having at least one lower support member mounted directly to the frame of an elevator car and an upper support member on which a roller guide is mounted wherein the adaptor is configured to allow the at least one lower support member to be tightly secured to the frame of an elevator car while the upper support member and the roller guide are positioned on and/or connected to the lower support member.

Yet still another object of a preferred embodiment of the present invention is to provide a universal adaptor for mounting an elevator roller guide to the frame of an elevator car having a first lower support member and a second lower support member each being mounted directly to the frame of an elevator car and an upper support member carrying the roller guide and being connected to the first and second lower support members wherein the first lower support member can be positioned relative to the second lower support member in numerous different orientations including a parallel orientation as well as numerous non-parallel orientations.

Another object of a preferred embodiment of the present invention is to provide a universal adaptor for mounting an elevator roller guide to the frame of an elevator car where all of the bolts used to connect the roller guide to the adaptor, connect adaptor components together and connect the adaptor to the frame of an elevator are oriented to the same manner (e.g., vertically oriented).

A further object of a preferred embodiment of the present invention is to provide a universal adaptor for mounting an elevator roller guide to the frame of an elevator car that dampens vibrations transmitted to the elevator car.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, a preferred embodiment of the present invention is directed to a universal adapter assembly for connecting a roller guide to a frame of an elevator car where an existing hole pattern in the frame of the elevator car is different from an existing hole pattern of the roller guide. The universal adapter assembly includes first and second lower mounting members each configured to be adjustably connected to the frame of the elevator car. An upper mounting member having a plurality of apertures forming a first hole pattern. The first hole pattern is the same as an existing hole pattern of the roller guide to allow the roller guide to be readily mounted on the upper mounting member. The upper mounting member is configured to be adjustably connected to the first and second lower mounting members to permit the upper mounting member to be adjusted relative to the first and second lower mounting members and to permit the first lower mounting member to be oriented nonparallel to the second lower mounting member when the first and second lower mounting members are connected to the frame of an elevator car and the upper mounting member is mounted on the first and second lower mounting members.

Another preferred embodiment of the present invention is directed to a universal adapter assembly for connecting a roller guide to a frame of an elevator car where an existing hole pattern in the frame of the elevator car is different from an existing hole pattern of the roller guide. The universal adapter assembly includes at least one lower member having at least a first opening and a second opening. The first opening is an enlarged opening for receiving a first fastener to connect the at least one lower member to the frame of the elevator car. The first opening is configured to permit adjustment of the at least one lower member relative to the first fastener when the first fastener is connected to the frame of the elevator car. An upper member has a plurality of apertures forming a first hole pattern. The first hole pattern is the same as an existing hole pattern of the roller guide to allow the roller guide to be readily connected to the upper member. The upper member has an enlarged opening for receiving a second fastener to connect the upper member to the at least one lower member. The second fastener is configured to be inserted into the second opening of the at least one lower member. The enlarged opening of the upper member is configured to permit the upper member to be adjusted relative to the at least one lower member. The first fastener is disposed such that the first fastener can be readily tightened to a final securement position while the upper member is connected to the at least one lower member.

A further preferred embodiment of the present invention is directed to a universal adapter assembly for connecting a roller guide to a frame of an elevator car where an existing hole pattern in the frame of the elevator car is different from an existing hole pattern of the roller guide. The universal adapter assembly includes at least one lower member having at least a first opening and a second opening. The first opening is an enlarged opening for receiving a first fastener to connect the at least one lower member to the frame of the elevator car. The first opening is configured to permit adjustment of the at least one lower member relative to the first fastener when the first fastener is connected to the frame of the elevator car. An upper member has a plurality of apertures forming a first hole pattern. The first hole pattern is the same as an existing hole pattern of the roller guide to allow the roller guide to be readily connected to the upper member by a plurality of second fasteners. The upper member has enlarged opening for receiving a third fastener to connect the upper member to the at least one lower member. The third fastener is configured to be inserted into the second opening of the at least one lower member. The enlarged opening of the upper member permits the upper member to be adjusted relative to the at least one lower member. The first fastener extends parallel to the third fastener and each of the plurality of second fasteners when the roller guide and the universal adapter are installed on the frame of the elevator car.

Yet a further preferred embodiment of the present invention is directed to a universal adapter assembly for connecting a roller guide to a frame of an elevator car where an existing hole pattern in the frame of the elevator car is different from an existing hole pattern of the roller guide. The universal adapter assembly includes at least one lower member having at least a first opening and a second opening. The first opening is an enlarged opening for receiving a first fastener to connect the at least one lower member to the frame of the elevator car. The first opening is configured to permit adjustment of the at least one lower member relative to the first fastener when the first fastener is connected to the frame of the elevator car. An upper member has a plurality of apertures forming a first hole pattern. The first hole pattern is the same as an existing hole pattern of the roller guide to allow the roller guide to be readily connected to the upper member. The upper member has a first end, a second end and a mid-section extending from the first end to the second end. At least one of the first end and the second end has a slot for receiving a second fastener to connect the upper member to the at least one lower member. The mid-section has a width less than a width of the first end. The width of the mid-section is also less than a width of the second end. The second fastener is configured to be inserted into the second opening of the at least one lower member. The slot is configured to permit the upper member to be adjusted relative to the at least one lower member. The first fastener is disposed such that at least a portion of the first fastener extends outwardly from the mid-section of the upper member so that the first fastener can be readily tightened to a final securement position while the upper member is connected to the at least one lower member.

BRIEF DESCRIPTION OF THE DRAWINGS

FIG. 2 is an exploded perspective view of the mounting assembly and roller guide depicted in FIG. 1 taken from a different vantage point than FIG. 1.

FIG. 3 is an exploded front elevational view of the mounting assembly and roller guide depicted in FIG. 1.

FIG. 4 is an exploded side elevational view of the mounting assembly and roller guide depicted in FIG. 1

FIG. 5 is a perspective view of the mounting assembly depicted in FIG. 1.

DETAILED DESCRIPTION OF THE PREFERRED EMBODIMENT OF THE INVENTION

Figure 1:
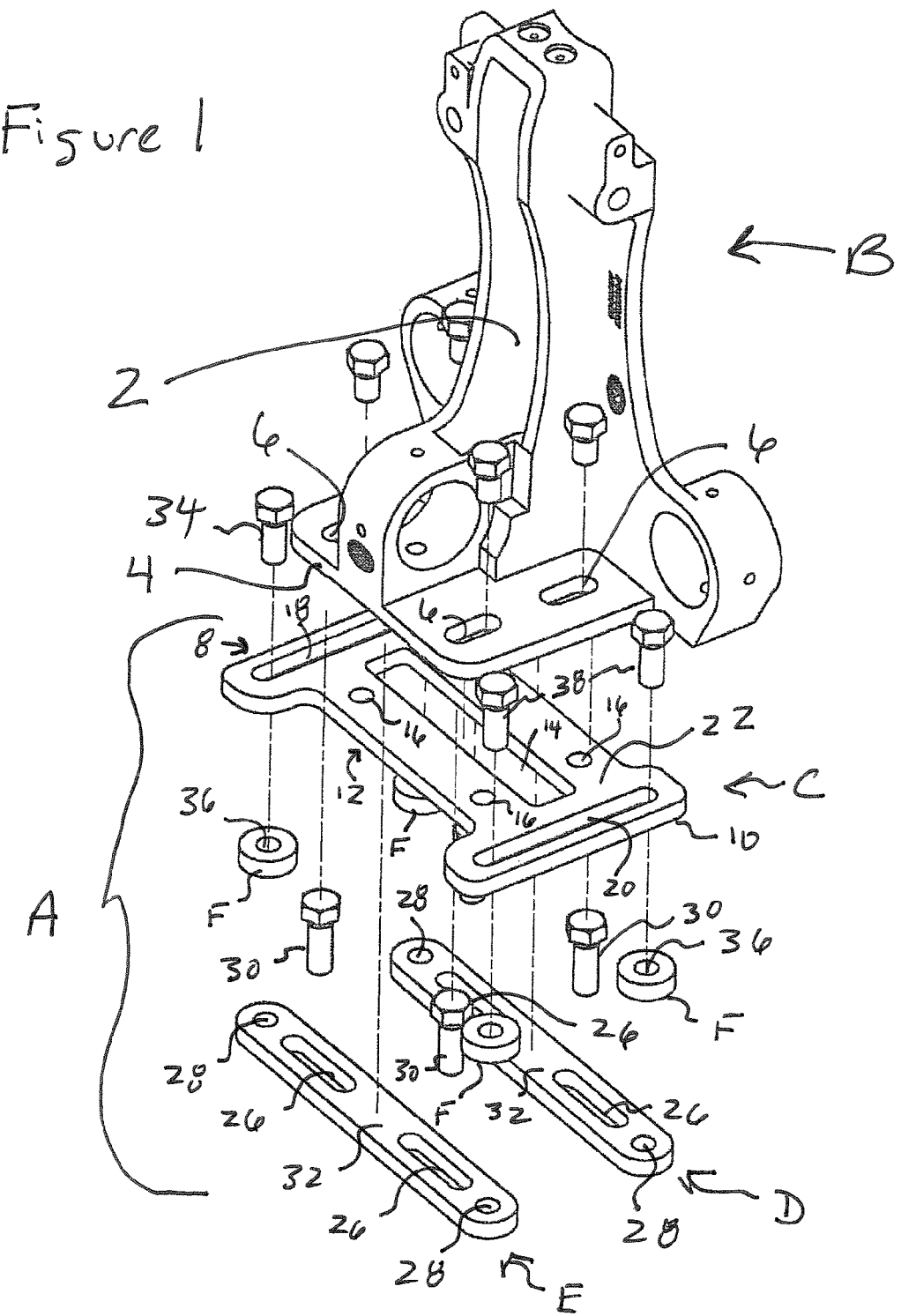
FIG. 1 is an exploded perspective view of a mounting assembly formed in accordance with a preferred embodiment of the present invention positioned below a roller guide.

The preferred form of the invention will now be described with reference to FIGS. 1-5. The appended claims are not limited to the preferred form and no term and/or phrase used herein is to be given a meaning other than its ordinary meaning unless it is expressly stated that the term and/or phrase shall have a special meaning.

FIGS. 1-5

Referring to FIGS. 1 to 5, a preferred form of universal adaptor assembly A is illustrated in one of many possible configurations. One of many different types of roller guides that the universal adaptor assembly A can be used with is shown in FIGS. 1 to 4. Roller guide B, as shown in FIGS. 1 to 4, is of the type disclosed in U.S. Pat. No. 7,562,749. The rollers and other components of roller guide B have been removed so that the preferred operable association of the universal adaptor assembly A and roller guide B can be readily seen. It is important to note that the present invention is not limited to use with roller guide B. Rather, the universal adaptor assembly A can be used with any suitable roller guide.

Roller guide B includes a central opening 2 that receives a central roller (not shown) that rides on the front face of a corresponding guide rail. A pair of side rollers are positioned one on each side of the central roller. The side rollers engage the corresponding side faces of the guide rail. Roller guide B includes a base 4 having four bolt holes 6 forming a specific bolt hole pattern. As previously explained, when the bolt hole pattern formed in base 4 did not match the bolt hole pattern of the frame of an elevator car, additional time consuming steps would be required including fabricating an adapter plate after taking the necessary measurements of the exiting bolt hole pattern on the frame of the elevator car and the existing bolt hole pattern of the roller guide. The preferred form of the present invention eliminates the above time consuming steps.

Referring to FIGS. 1 to 5, universal adapter assembly A includes an upper mounting or support member C and lower mounting or support members D and E. Lower mounting member D is preferably identical to lower mounting member E. It will be readily appreciated that a single large lower support member could be used in place of lower mounting members D and E. Support member C is preferably I-shaped with an enlarged left end 8, an enlarged right end 10 and a narrowed mid-section 12 extending between left end 8 and right end 10. Narrowed mid-section 12 has a width less than the width of each of ends 8 and 10. An enlarged elongated slot 14 is formed in the mid-section 12 and extends between left end 8 and right end 10. Four threaded bolt holes 16 surround elongated slot 14 and form a bolt hole pattern in upper member C that matches or is complementary to the bolt hole pattern formed in base 4 of roller guide B so that the roller guide B can be readily connected to upper support member C by four bolts 17. The slot 14 preferably has a length greater than the distance between the two pairs of spaced holes 16. An elongated slot 18 is formed in left end 8 and an elongated slot 20 is formed in right end 10. Preferably, elongated slot 18 is identical to elongated slot 20 in size and shape. Elongated slots 18 and 20 each have a length greater than the width of mid-section 12. The upper surface 22 and lower surface 24 of support member C are each preferably planar or substantially planar. Also, support member C preferably has a uniform thickness. Support member C is further preferably free of upwardly or downwardly extending lips, skirts or flanges.

Figure 2A:
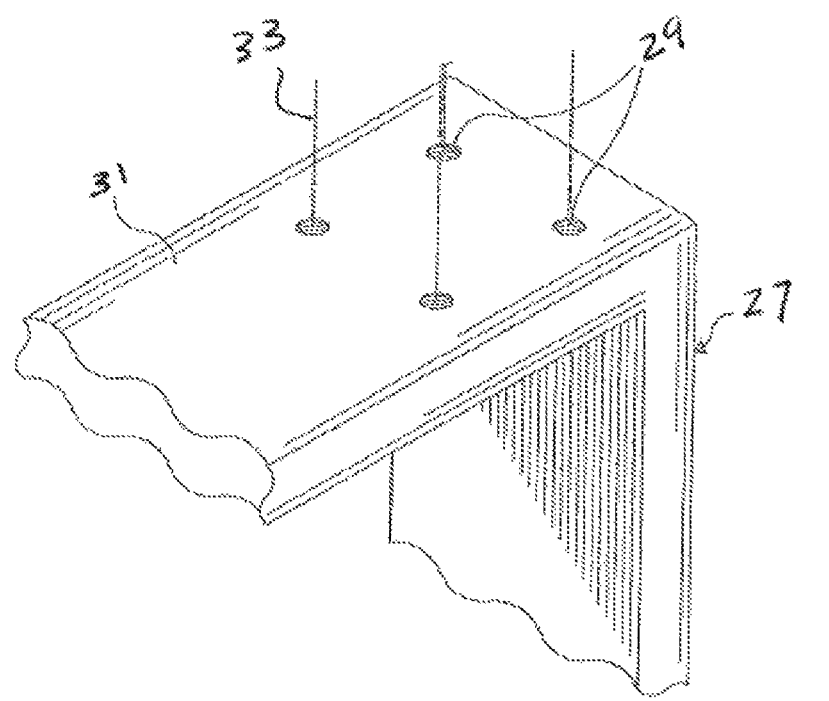
FIG. 2A is a fragmentary perspective view of a frame of an elevator car with a preexisting bolt hole pattern.

Each of support members D and E include a pair of elongated slots 26 extending between threaded openings 28 formed adjacent each of the ends of support members D and E. A bolt 30 extends through each of the elongated slots 26 to secure support members D and E directly to the frame 27 of an elevator car having an existing bolt hole pattern 29 formed in surface 31 as seen in FIG. 2A. Dashed lines 33 in FIG. 2A represent the orientation of bolts 30 relative to the corresponding holes of the bolt hole pattern 29. The enlarged nature of slots 26 allow the position of support members D and E to be adjusted when loosely connected by bolts 30 to the frame of the elevator car.

A spacer member F is aligned with each of the threaded openings 28 formed in support members D and E. The four spacer members F space the lowermost surface 24 of support C from uppermost surface 32 of each of support members C and D a distance greater than the height of the bolt heads of bolts 30 to permit an installer to tighten or loosen bolts 30 when member C is mounted on members D and E. The spacers F can be formed from a damping material (e.g., elastomeric material) to dampen vibrations transmitted to the elevator car through the adaptor assembly A.

The narrowed mid-section 12 can be sized to fully expose or at least partially expose the heads of bolts 30 to allow an installer ready access to the bolt heads to tighten or loosen bolts 30. The absence of vertically extending lips, flanges or skirts on support members C, D and E also facilitates access to bolts 30. The configuration and association of support member C and support member D and E allow the bolts 30 to be completely tightened while the support member C and roller guide B are mounted on support members D and E.

Two bolts 34 extend through elongated slot 18 and bore 36 of the corresponding spacer F and are threaded into the corresponding opening 28 in support members D and E. Two bolts 38 extend through elongated slot 20 and bore 36 of the corresponding spacer F and are threaded into the corresponding opening 28 in support members D and E. The elongated slots 18 and 20 permit adjustment of support member C relative to support members D and E. Further, elongated slots 18 and 20 permit the orientation of support member D relative to support E to be varied. For example, the support members can be maintained parallel to each other as shown in, for example, FIG. 1 or one or both can be angled relative to the other. For example, the left ends of support members D and E can be closer to each other than the right ends of support members D and E or vice-a-versa. This provides a great deal of flexibility to compensate for issues that might arise during installation. For example, if one bolt hole in a rectangular bolt hole pattern of a frame of an elevator car becomes unusable for whatever reason, a new bolt hole can be formed adjacent but spaced form the unusable bolt hole. Because the support members D and E can be oriented at positions other than parallel to each other, the preferred form of mounting assembly can readily accommodate the new bolt hole formed in the frame of an elevator car.

As seen in FIGS. 1 to 5, bolts 17, 30, 36 and 38 all preferably extend parallel to each other making installation easier and faster. Also, the preferred form of the present invention does not use nuts with any of bolts 17, 30, 36 and 38 due to the nature of the bolts and the threaded openings formed in the corresponding parts. This again makes installation easier and faster.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

The invention claimed is:

1. A universal adapter assembly for connecting a roller guide to a frame of an elevator car where a hole pattern in the frame of the elevator car is different from a hole pattern of the roller guide, said universal adapter assembly comprising:
    (a) a first mounting member having a plurality of apertures forming a first hole pattern, the first hole pattern is complementary to the hole pattern of the roller guide to allow the roller guide to be readily mounted on said first mounting member, said first mounting member having a first longitudinal axis; and,
    (c) a second mounting member having a second longitudinal axis and being configured to be adjustably connected to said first mounting member such that said second mounting member can be oriented relative to said first mounting member so that said second longitudinal axis forms an angle with said first longitudinal axis less than 90 degrees and greater than 0 degrees when said first mounting member is connected to said second mounting member.

2. The universal adapter assembly as set forth in claim 1, wherein:
    (a) the hole pattern in the frame of the elevator car includes at least five holes and one of the at least five holes is useable to attach the universal adapter assembly to the frame of the elevator car.

3. The universal adapter assembly as set forth in claim 1, wherein:
    (a) said first mounting member has a first end, a second end and a mid-section extending between said first end and said second end, said mid-section having a width less than a width of at least one of said first end and said second end.

4. The universal adapter assembly as set forth in claim 1, wherein:
    (a) said first mounting member has a first end, a second end and a mid-section extending between said first end and said second end, said mid-section having a width less than a width of said first end and said mid-section having a width less than a width of said second end.

5. The universal adapter assembly as set forth in claim 1, wherein:
    (a) said first mounting member has a continuous outer perimeter, said continuous outer perimeter of said first mounting member has a uniform thickness.

6. A universal adapter assembly for connecting a roller guide to a frame of an elevator car where a hole pattern in the frame of the elevator car is different from a hole pattern of the roller guide, said universal adapter assembly comprising:
    (a) at least one lower member having at least a first opening, said first opening being an enlarged opening for receiving a first fastener to connect the at least one lower member to the frame of the elevator car, said first opening being configured to permit adjustment of said at least one lower member relative to the first fastener when the first fastener is connected to the frame of the elevator car; and,
    (b) an upper member having a plurality of apertures forming a first hole pattern, the first hole pattern is complementary to the hole pattern of the roller guide to allow the roller guide to be readily connected to said upper member, said upper member being configured to be adjustably connected to said at least one member so that said upper member can be adjusted relative to said at least one lower member, said upper member being free of upwardly and downwardly extending lips, skirts and flanges.

7. The universal adapter assembly as set forth in claim 6, wherein:
    (a) said upper member has a continuous outer perimeter, said continuous outer perimeter of said upper member has a uniform thickness.

8. The universal adapter assembly as set forth in claim 6, wherein:
    (a) said upper member has a first end, a second end and a mid-section extending between said first end and said second end, said mid-section having a width less than a width of at least one of said first end and said second end.

9. The universal adapter assembly as set forth in claim 6, wherein:
    (a) said upper member has a first end, a second end and a mid-section extending between said first end and said second end, said mid-section having a width less than a width of said first end and said mid-section having a width less than a width of said second end.

10. The universal adapter assembly as set forth in claim 6, wherein:
    (a) all holes formed in said upper member have a bore oriented perpendicular to an uppermost planar surface of said upper member.

11. The universal adapter assembly as set forth in claim 10, wherein:
    (a) all holes formed in said lower member have a bore oriented perpendicular to an uppermost planar surface of said upper member.

12. The universal adapter assembly as set forth in claim 11, wherein:
    (a) all fasteners of said universal adapter assembly extend parallel to each other.

13. A universal adapter assembly for connecting a roller guide to a frame of an elevator car where a hole pattern in the frame of the elevator car is different from a hole pattern of the roller guide, said universal adapter assembly comprising:
    (a) at least one lower member having at least a first opening, said first opening being an enlarged opening for receiving a first fastener to connect the at least one lower member to the frame of the elevator car, said first opening being configured to permit adjustment of said at least one lower member relative to the first fastener when the first fastener is connected to the frame of the elevator car;

(b) an upper member having a plurality of apertures forming a first hole pattern, the first hole pattern is complementary to the hole pattern of the roller guide to allow the roller guide to be readily connected to said upper member, said upper member being configured to be adjustably connected to said at least one lower member so that said upper member can be adjusted relative to said at least one lower member; and, (c) at least one spacer positioned between said at least one lower member and said upper member for spacing said at least one lower member from said upper member a distance greater than a height of a head of a first fastener wherein the first fastener is used to secure said at least one lower member to the frame of the elevator car.

14. The universal adapter assembly as set forth in claim 13, wherein:
(a) an uppermost surface of said at least one spacer is disposed below a lowermost surface of said upper member and a lowermost surface of said at least one spacer is disposed above an uppermost surface of said at least one lower member.

15. The universal adapter assembly as set forth in claim 13, wherein:
(a) said upper member has a continuous outer perimeter, said continuous outer perimeter of said upper member has a uniform thickness.

16. The universal adapter assembly as set forth in claim 13, wherein:
(a) said at least one lower member has a continuous outer perimeter, said continuous outer perimeter of said at least one lower member has a uniform thickness.

17. The universal adapter assembly as set forth in claim 13, wherein:
(a) said at least one spacer is formed from an elastomeric material.

18. The universal adapter assembly as set forth in claim 13, wherein:
(a) said at least one spacer has a bore extending parallel to each bore formed in all holes formed in said at least one lower member and said upper member.

19. The universal adapter assembly as set forth in claim 13, wherein:
(a) said upper member has a first end, a second end and a mid-section extending between said first end and said second end, said mid-section having a width less than a width of at least one of said first end and said second end.

20. The universal adapter assembly as set forth in claim 13, wherein:
(a) said upper member has a first end, a second end and a mid-section extending between said first end and said second end, said mid-section having a width less than a width of said first end and said mid-section having a width less than a width of said second end.

* * * * *